United States Patent [19]

Beard et al.

[11] Patent Number: 5,709,506

[45] Date of Patent: Jan. 20, 1998

[54] TRANSPORT SYSTEM FOR FABRIC PIECES

[75] Inventors: A. Gregory Beard, Raleigh; Judson H. Early, Fuquay-Varina, both of N.C.

[73] Assignee: Textile/Clothing Technology Corporation, Cary, N.C.

[21] Appl. No.: 659,880

[22] Filed: Jun. 7, 1996

[51] Int. Cl.$^6$ ................................. B65G 51/02
[52] U.S. Cl. ............. 406/1; 406/2; 406/3; 406/19; 406/62; 406/115; 406/151; 406/176
[58] Field of Search ............... 406/1, 2, 3, 19, 406/62, 113, 115, 151, 152, 154, 176

[56] References Cited

U.S. PATENT DOCUMENTS

| | | | |
|---|---|---|---|
| 472,607 | 4/1892 | Murray. | |
| 1,753,987 | 4/1930 | Hohne. | |
| 3,163,470 | 12/1964 | Brewin et al. | 302/28 |
| 3,185,434 | 5/1965 | Bozich | 251/134 |
| 3,207,559 | 9/1965 | Poteat et al. | 302/27 |
| 3,224,812 | 12/1965 | Bozich | 302/28 |
| 3,453,028 | 7/1969 | Foreman | 302/27 |
| 3,556,437 | 1/1971 | Svedman | 243/38 |
| 3,574,409 | 4/1971 | Furgenberg | 302/2 |
| 3,945,683 | 3/1976 | Wise | 406/3 |
| 5,091,082 | 2/1992 | Yost | 210/196 |

*Primary Examiner*—Gary C. Hoge
*Attorney, Agent, or Firm*—Myers Bigel Sibley & Sajovec, LLP

[57] ABSTRACT

The fabric transport system comprises a series of fluidly communicating tubes and includes: an intake line configured to receive a fabric piece from the predetermined departure location; a main line fluidly connected at one end with the intake line; a branch line being fluidly connected at its upstream end to an intermediate portion of the main line at a junction; a vacuum source connected with the downstream end of the branch line for drawing air of sufficient quantity and velocity through the intake line, the main line, and the branch line to draw a fabric piece into the intake line and the main line; and a counterflow valve positioned on an intermediate portion of the main line downstream of the junction between the main line and the branch line. The branch line includes a deposit nozzle leading to the predetermined destination. The fabric transport system further includes means, such as an electronic controller, for actuating the counterflow valve to take its open position prior to a fabric piece passing the junction such that air is drawn into the main line and subsequently into the branch line by the vacuum source.

23 Claims, 5 Drawing Sheets

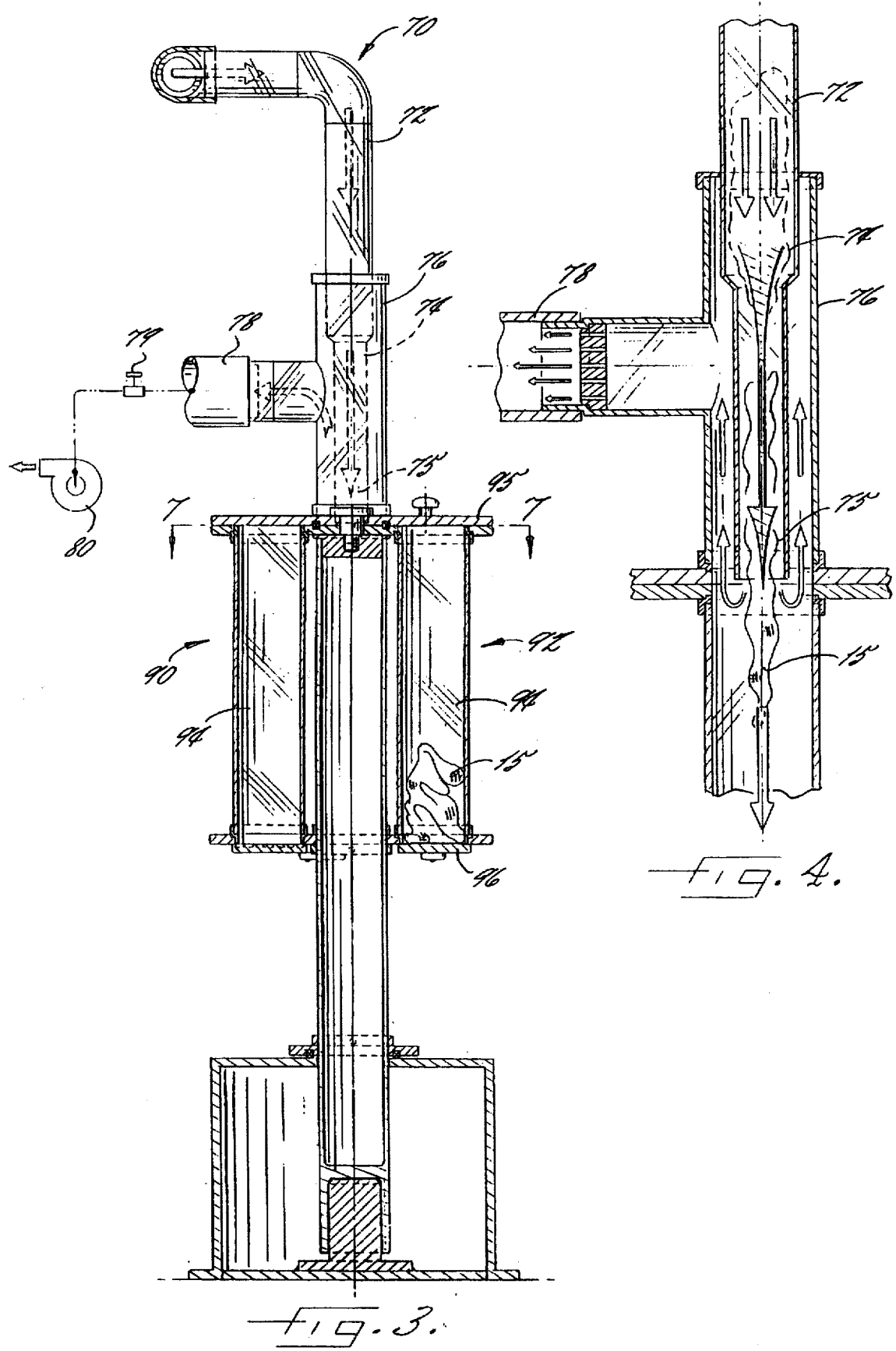

TRANSPORT SYSTEM FOR FABRIC PIECES

FIELD OF THE INVENTION

The present invention relates generally to manufacturing processes, and relates more particularly to a textile clothing manufacturing process.

BACKGROUND OF THE INVENTION

There is significant interest in the clothing industry to reduce the cost of producing clothing while also improving clothing quality, fit, and availability. One proposal to improve the speed and quality with which clothing is produced is the APPAREL ON DEMAND™ clothing production concept developed by Textile Clothing Technology Corporation of Cary, N.C. This concept is one in which garments are custom-produced for customers through automated processes. The concept begins with the customer selecting patterns and fabrics for a particular garment at a clothing store. The customer is then electronically measured at the store or other location. The customer's measurements are transmitted to a remote location, where fabric is accessed, custom-cut and sewn based on the customer's fabric and pattern selections and measurements. The finished product is then returned to the clothing store where it is furnished to the customer.

Clearly, one of the key elements to the aforementioned production concept is the factory in which the clothing is actually cut and sewn. In such a factory, because clothing is not mass-produced in the same fabric pattern, it is often more efficient to have several different stations for producing components of a garment in different locations. For example, sleeves for different garments may be sewn in one location, lapels and buttonholes in another, and front and rear panels in a third. These components might then be combined at a separate finishing station to produce the finished garment.

Generally, fabric for a garment, suit, or ensemble is cut from a localized area on the same sheet of cloth to ensure precise color matching. This presents a manufacturing difficulty if, as described above, the factory has multiple stations for sewing different components of a garment. Conventional manufacturing facilities are constructed such that fabric pieces from an original cloth sheet are manually removed from the cutting station and manually distributed to the work stations, which requires that each piece be labeled to identify how the garment is to be assembled.

In some facilities, many layers of cloth may be cut at a single cutting station and then transferred to different sewing stations. This method requires the handling of bundles of cut fabric pieces, which presents problems such as color matching, distribution of the bundles to remote workstations, and reduced garment size flexibility. Moreover, in such a system, safeguards should be included to ensure that the fabric pieces are labelled; otherwise an operator at a sewing station may inadvertently sew together pieces intended for different garments. Also, because the sewing of fabric pieces is performed at locations remote from cutting, it is important that the transportation of the fabric pieces be rapid and, in the interest of cost, accomplished with a minimum of labor.

Prior work has been completed for the transport of textile articles within a manufacturing facility. For example, U.S. Pat. No. 3,207,559 to Poteat et al. is directed to a textile article collection system. The system is designed to receive articles, such as hosiery, from different sources and transport them to a common collection point. The system includes a series of knitting machines, each of which is equipped with a blower and a delivery tube. Each delivery tube ultimately leads to a main conveyor tube, which in turn leads to a discharge tube that empties into a collection container. In this system, articles are conveyed by positive pressure applied by the blower through the delivery tube and into the main conveyor tube; they then pass through the discharge tube and into the container.

As another example of a system for transporting textiles between different locations, U.S. Pat. No. 3,163,470 to Brewin et al. discusses a distribution system for lightweight articles, such as textiles. The system includes a central duct that feeds into a tube having a horizontal run. In the horizontal run are several tubular T-fittings that lead to branch pipes. A one-way flap valve is positioned between each T-fitting and each branch pipe. A series of nozzles are attached to the horizontal run and are positioned so that each directs a blast of air through the stem of the T-fitting and toward the valve. In operation, textile articles from a common source, such as an examining point, are received within the central duct and proceed from there through the tube into the horizontal run. Only one of the nozzles is actuated; the remaining nozzles are not. Actuation of the nozzle opens a valve flap of the corresponding valve and also propels the textile article through the stem of the corresponding T-fitting, through the valve, and into the pipe for further passage to its appointed destination.

One significant shortcoming of the Brewin system is that it includes no provision for textile articles that "overshoot" the intended branch pipe; if a textile article has sufficient momentum to travel past the proper branch pipe despite the air blast from the corresponding nozzle, there is no back-up system in place to recover the article and return it to the proper location. Thus, if an article overshoots its intended destination, not only is that article unlikely to be correctly distributed, it can also block the system for subsequent articles. As discussed above, inaccuracy in delivery of parts can reduce efficiency of sewing operations significantly.

SUMMARY OF THE INVENTION

In view of the foregoing, it is an object of the present invention to provide a system for transporting fabric pieces from a cutting table to a predetermined one of a number of different destinations quickly and easily.

It is also an object of the present invention to provide a method for operating such a system.

It is a further object of this invention to provide a system for transporting fabric articles to a predetermined one of a number of destinations that includes a mechanism for preventing and correcting "overshooting" of fabric articles.

It is still another object of the present invention to provide a method for using such a fabric transport system.

These and other objects are satisfied by the present invention, which provides a rapid, accurate system for transporting fabric pieces from a predetermined departure location to one of a number of predetermined destinations. The fabric transport system comprises a series of fluidly communicating tubes and includes: an intake line configured to receive a fabric piece from the predetermined departure location; a main line fluidly connected at one end with the intake line; a branch line being fluidly connected at its upstream end to an intermediate portion of the main line at a junction; a vacuum source connected with the downstream end of the branch line for drawing air of sufficient quantity and velocity through the intake line, the main line, and the branch line to draw a fabric piece into the intake line and the main line; and a counterflow valve positioned on an intermediate portion of the main line downstream of the junction between the main line and the branch line. The branch line includes a deposit nozzle leading to the predetermined destination. The fabric transport system further includes means, such as an electronic controller, for actuating the counterflow valve to take its open position prior to a fabric piece passing the branch line junction such that secondary air is drawn through the counterflow valve into the main line and subsequently into the branch line by the vacuum source. As a result, a fabric piece traveling in the main line is urged by the secondary air to be shunted into the branch line (and subsequently into the deposit nozzle and to the predetermined destination) from the main line even if its momentum causes it to pass the branch line junction initially.

In a preferred embodiment, the fabric transport system of the present invention includes a fabric cutting table for supporting a fabric sheet, a knife, laser, or other cutting means for cutting a fabric sheet into one or more fabric pieces, and a table or other support means for supporting the fabric pieces in respective departure positions. Preferably, the support, or unloading, table is integrated with the cutting table and cutting means such that the fabric pieces remain in the same pattern on the unloading table as when they were cut. Also, it is preferred that the system include multiple branch lines that are fluidly connected with the main line.

In another embodiment, the fabric transport system includes at least a second branch line that intersects with the main line and that leads to a second predetermined destination. Preferably, the main line includes a second counterflow valve positioned downstream of the intersection between the second branch line and the main line to assist a fabric piece into the second branch line and subsequently to the second predetermined destination.

Another aspect of the present invention is a branch line of a fabric transport system that includes an upstream conduit, a downstream conduit, a deposit nozzle, and a bifurcating section having a lumen. The upstream conduit is connected to the main line and to the deposit nozzle. The deposit nozzle has a downstream outlet end that resides within the lumen of the bifurcating section and leads to a predetermined destination. The downstream conduit is fluidly connected to the bifurcating section and to a vacuum source. The downstream conduit is connected with the bifurcating section at a junction positioned adjacent an intermediate portion of the deposit nozzle. As such, air exiting the deposit nozzle must reverse its direction to flow into the downstream conduit. In this configuration, a fabric piece exiting the deposit nozzle has sufficient momentum to continue in the direction it was traveling and therefore reach the predetermined destination; it does not reverse its direction and follow the air flow into the downstream conduit. As a result, the fabric piece is simply deposited into a receiving container, such as a receiving tube, at the predetermined destination. Preferably, the downstream end of the deposit nozzle is narrower than the upstream end in order to accelerate the exiting fabric piece as it travels therethrough.

The present invention is described in greater detail hereinbelow with reference to the following drawings.

BRIEF DESCRIPTION OF THE FIGURES

FIG. 3 is an enlarged end view of a receiving station of FIG. 2 with the exit door in its closed position.

FIG. 4 is a partial section view taken along lines 4—4 of FIG. 2 showing the diverging paths of air and fabric within the branch line.

DETAILED DESCRIPTION OF THE PREFERRED EMBODIMENT

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As noted above, the present invention relates to an apparatus and method for transporting fabric pieces from a departure point, such as a cutting or unloading table, to a predetermined one of multiple destinations. The transport system includes a series of fluidly interconnected tubes or pipes (also referred to as lines, conduits, and the like), with the fabric pieces being conveyed through certain of these pipes. In the description of the present invention that follows, certain terms are employed to refer to the positional relationship of some structures or components relative to other structures. As used herein, the term "downstream" and derivatives thereof refer to the general direction fabric pieces and air travel as they move within the pipes of the system; this term is often used in manufacturing environments to indicate that certain material being acted upon has proceeded farther in the manufacturing process than other material. Conversely, the term "upstream" and derivatives thereof refer to the direction opposite the downstream direction. Together, the forward and rearward directions comprise the "longitudinal" dimension. As used herein, the terms "outer", "outward", "lateral", and derivatives thereof refer to the direction defined by a vector originating at the longitudinal axis of a given structure and extending perpendicularly thereto. Conversely, the terms "inner", "inward", and derivatives thereof refer to the direction opposite that of the outward direction. Together, the inward and outward directions comprise the "transverse" dimension. It should be noted that, relative to an absolute x-y-z coordinate axis system, these directions shift as the fabric pieces are conveyed between different portions of the piping system due to the layout of equipment on the plant floor. When they occur, the downstream direction is redefined with reference to the direction of air flow. It is to be understood that, when these shifts in the downstream direction occur, the other directions defined above shift similarly to retain their relative orientation with the downstream direction.

Figure 1:
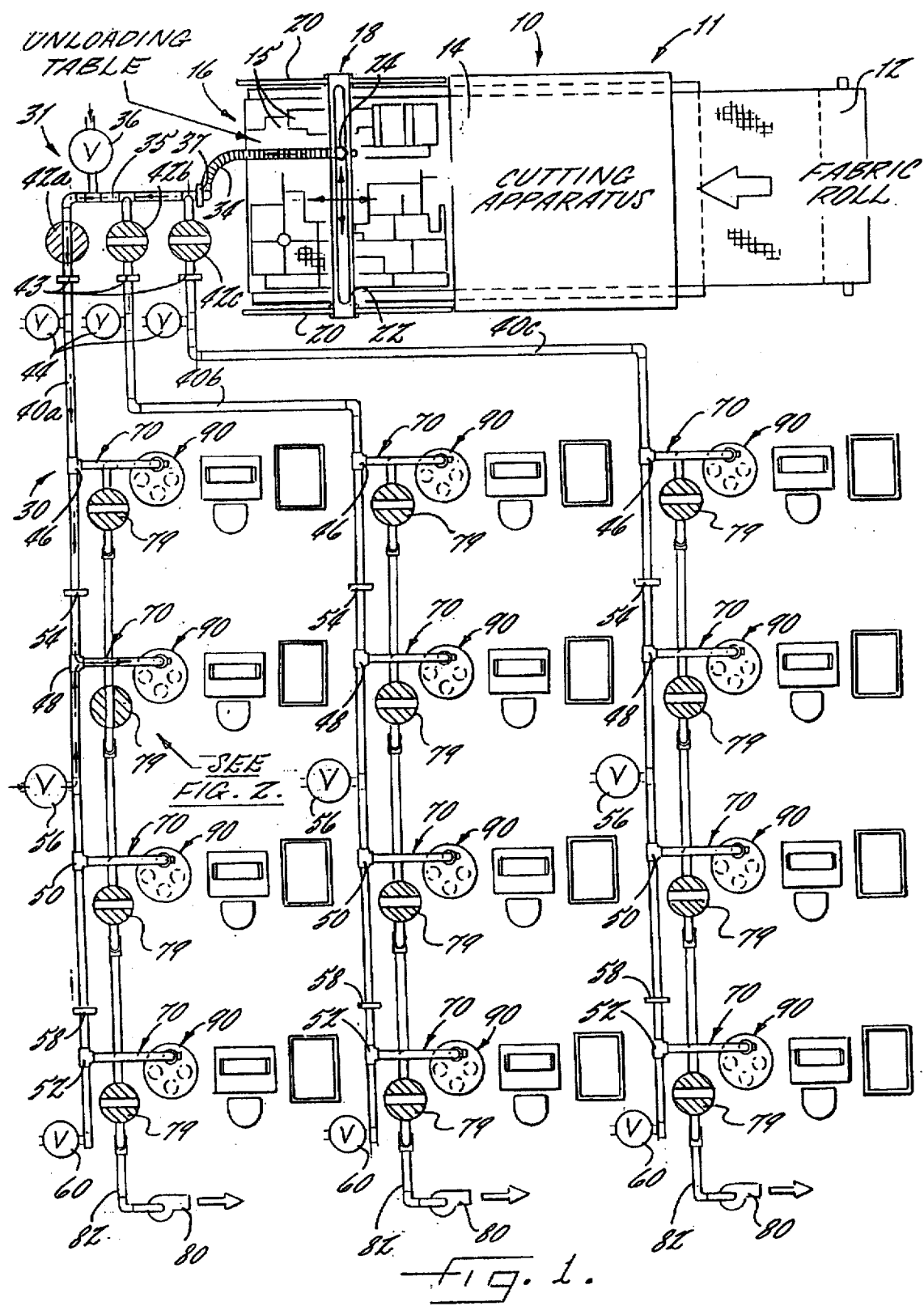
FIG. 1 is a plan view of an exemplary fabric transport system of the present invention.

Turning now to the Figures, an exemplary fabric transport system, designated broadly at 10, is illustrated schematically in FIG. 1. The fabric transport system 10 comprises generally a cutting station 11, a piping system 30, three vacuum sources 80, and a series of receiving stations 90. Each of these general components is described hereinbelow in greater detail.

The cutting station 11 comprises a cutting apparatus 14, which cuts individual fabric pieces 15 from a sheet of fabric unrolled from a transversely-disposed fabric roll 12. The cutting apparatus 14 can be any cutting apparatus known in this art to cut fabric pieces 15 according to a defined pattern, such as those employing a knife, laser, or other cutting device. It is preferred that the cutting apparatus 14 be electrically connected to a controller 17 (FIG. 8), microprocessor or other control system that is operably coupled with the cutting blade or laser and which has a receiving module that receives customer information and selects the proper pattern size based on a customer's measurements at a retail store or other location.

As described in greater detail hereinbelow, the controller 17 is electrically connected to position sensors, valves, and other components of the fabric transport system 10. Those skilled in this art will appreciate that the controller 17 can be configured in numerous ways with these components. Also, it should be understood that, when components are described herein as being "operatively coupled," these components are connected through the controller 17 such that an event occurring at, within, or to one component signals the controller to initiate an event with the operatively coupled component. This coupling can be instantaneous within the controller 17, or the signal from the controller 17 can be delayed for a predetermined time period as desired.

After the fabric is cut from the fabric roll 12, the fabric pieces 15 are conveyed to a horizontally-disposed unloading table 16 (FIG. 1). Illustratively and preferably, the fabric pieces 15 remain in the same relative positions as they take when they are cut at the cutting station 11. A gantry unit 18, which includes two longitudinally-extending channels 20 and a cross-member 22 that extends transversely across the presentation surface of the unloading table 16, is positioned above the unloading table 16. The cross-member 22 is mounted to the channels 20 such that it can translate longitudinally over the fabric pieces 15. A suction head 24 is slidably mounted for traverse movement on the cross-member 22. An articulating pincher 25 or other pick-up device is positioned on the suction head 24. The combined longitudinal movement of the cross-member 22 and the transverse movement of the suction head 24 enables the suction head 24, and therefore the pincher 25, to be moved to virtually any position above and adjacent the fabric pieces 15 resting upon the unloading table 16. Movements of the cross member 22 and the suction head 24 are directed by the controller 17 (see FIG. 8) based on the desired sequence for transporting fabric pieces to specific receiving stations 90.

Those skilled in this art will appreciate that other means for moving the suction head 24 to desired positions above the unloading table 16, such as a pivoting member mounted overhead via a ball-and-socket joint, a telescoping pivoting arm, a robotic articulating arm, or the like, can also be used with the present invention. Also, other pick-up devices, such as an articulating arm of a different configuration, a suction-based device, or the like, may also be suitable for the present invention.

Figure 2:
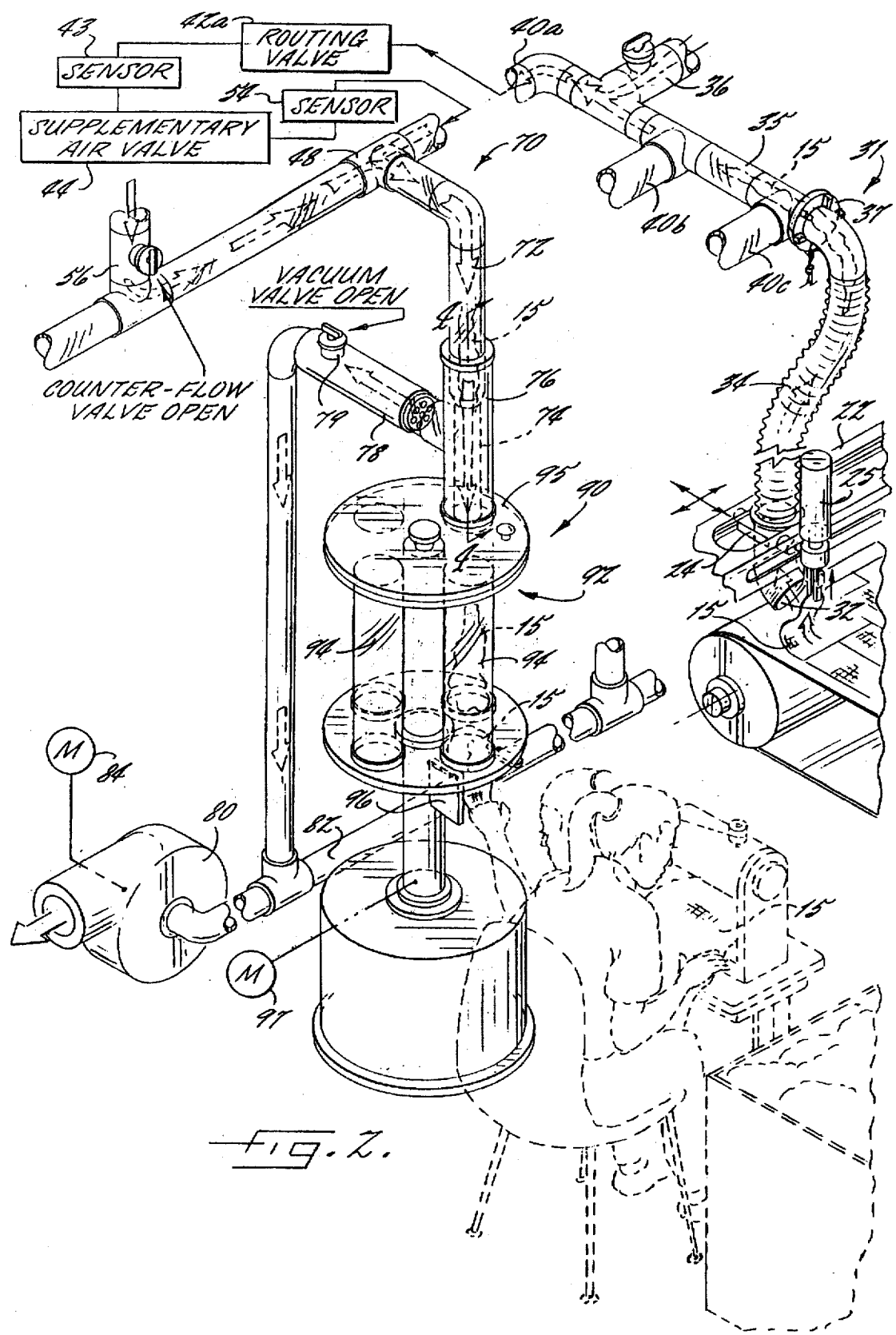
FIG. 2 is an enlarged perspective view of a branch line and receiving station of FIG. 1.

The suction head 24 is connected with the piping system 30 via an intake line 31, which includes an inlet nozzle 32 attached directly to the suction head 24 adjacent to the pincher 25 (FIG. 2). The inlet nozzle 32 leads to a flexible section 34 of the intake line 31 which has sufficient flexibility and resilience to enable the suction head 24 to move to any desired position above the unloading table 16. The flexible section 34 is attached at its downstream end to a more rigid, horizontally-disposed manifold section 35 of the intake line 31, where the intake line 31 terminates. The size of the pipes used to form the intake line 31 and the other lines of the piping system 30 are not critical; piping having a diameter of between about 3 and 4 inches is typically suitable for use with the present invention.

A counterflow valve 36 is connected to a downstream portion of the manifold 35. The counterflow valve 36 is electrically connected to the controller 17. Also, a photoelectric sensor 37 or other means for detecting the presence of a fabric piece in the manifold 35 is positioned at the upstream end of the manifold 35. Preferably, the photoelectric sensor 37 is operably coupled with the counterflow valve 36 through the controller 17.

As shown in FIGS. 1 and 2, three main lines 40a, 40b, 40c directly merge with the manifold section 35, with the main lines 40b and 40c exiting the manifold 35 upstream of the counterflow valve 36, and the main line 40a exiting the manifold 35 downstream of the counterflow valve 36. Except for the locations on the manifold section 35 with which the main lines 40a, 40b, 40c connect, the main lines 40a, 40b, 40c are generally similar in configuration and operation. In the interest of clarity and brevity, only the main line 40a will be described in detail hereinbelow; those skilled in this art will understand that the discussion of the main line 40a is equally applicable to main lines 40b and 40c . Also, those skilled in this art will understand that, although the main lines 40b and 40c are illustrated at having the same number of receiving stations 90 located in the same positions as those of main line 40a, these components can be varied in number and position and still be encompassed by the present invention.

Referring again to FIG. 1, just downstream of its interconnection with the manifold section 35, the main line 40a includes a routing valve 42a which is electrically connected with the controller 17. The routing valve 42a, as well as the other valves described herein, can be any known to those skilled in this art to be moveable between open and closed positions and thereby permit and prevent air flow. Opening and closing of the valve 42a is controlled by the controller 17 (FIG. 8); illustratively and preferably, the controller 17 controls the opening of the routing valves 42a, 42b, 42c such that, at most, only one of these valves is in its open position at any time to prevent a fabric piece from entering the incorrect main line.

Just downstream of the routing valve 42a, a photoelectric sensor 43 or other means configured to detect the presence of a passing fabric piece is positioned adjacent to the main line 40a (FIG. 1). Also, a supplementary air valve 44 is positioned slightly downstream of the sensor 43. Both the photoelectric sensor 43 and the supplementary air valve 44 are electronically connected to the controller 17 (FIG. 8), which operably couples these components such that passage of a fabric piece past the photoelectric sensor 43 signals the controller 17 to open the supplementary valve 44. Similarly, the routing valve 42a is operably coupled with the photoelectric sensor 43 so that detection thereby of a passing fabric piece 15 causes the controller 17 to signal the routing valve 42a to close.

Figure 8:
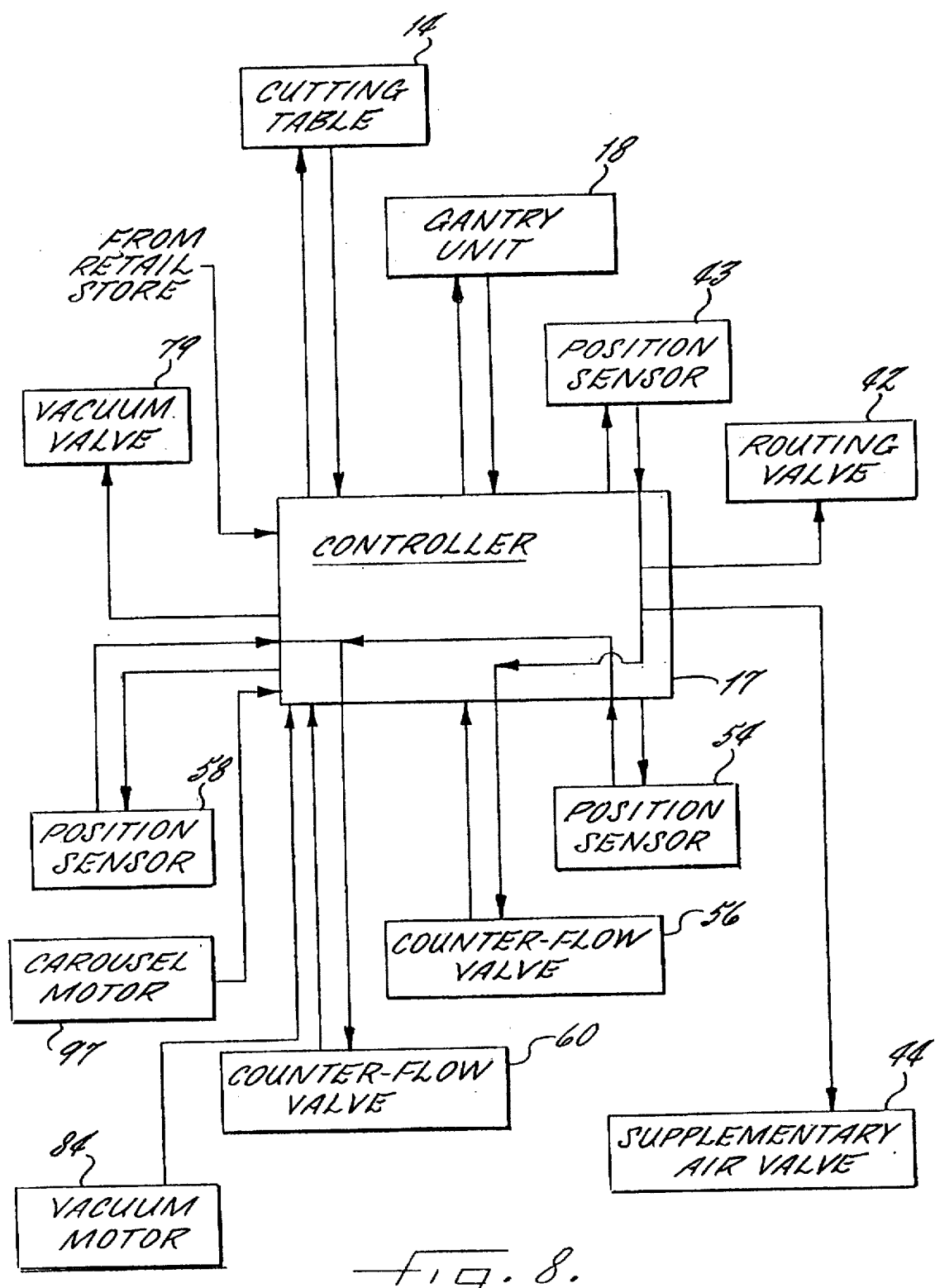
FIG. 8 is a schematic illustration of an exemplary controller employed with the fabric transport system of the present invention to control cutting, unloading, and transport operations.

Continuing to move downstream along the main line 40a (FIG. 1), four T-fittings 46, 48, 50, 52 are spaced along the expanse of the main line 40a, each of which interconnects with a branch line 70. Preferably, each T-fitting includes a sizable inner radius between its main portion and its stem to facilitate the change in direction a fabric piece 15 must undergo to travel into the stem. A photoelectric sensor 54 is positioned just upstream of T-fitting 48, and a counterflow valve 56 is positioned just downstream of T-fitting 48. Both the photoelectric sensor 54 and the counterflow valve 56 are electrically connected to the controller 17 (FIG. 8). Also, just upstream of the T-fitting 52, a photoelectric sensor 58 is positioned adjacent the main line 40a, and a counterflow valve 60 is positioned just downstream of the T-fitting 52. As described above for the photoelectric sensor 54 and the counterflow valve 56, both the photoelectric sensor 58 and the counterflow valve 60 are electrically connected to the controller 17.

FIG. 2 illustrates a branch line 70, a receiving station 90, and the interrelationship of these components thereof with a vacuum source 80. Those skilled in this art will recognize that, although only a single branch line 70, receiving station 90, and vacuum source 80 are described in detail herein, the discussion thereof is equally applicable to the other branch lines 70, vacuum sources 80, and receiving stations 90.

Referring to FIGS. 2 and 3, the branch line 70 comprises an upstream conduit 72 having a deposit nozzle 74 on its downstream end, a bifurcating section 76, and a downstream conduit 78. The deposit nozzle 74 fits within the lumen of the bifurcating section 76 such that the deposit nozzle outlet end 75 is positioned well below the stem of the bifurcating section 76. The deposit nozzle outlet end 75 is also narrower in cross-section then its upstream end. The stem of the bifurcating section 76 is connected with the upstream end of the downstream conduit 78, which leads to and interconnects with a common vacuum line 82.

A vacuum valve 79 is positioned on the downstream conduit 78 just downstream of the bifurcating section 76. The vacuum valve 79 is electrically connected to the controller 17 (FIG. 8) such that, if the receiving station 90 corresponding to the branch line 70 that contains the vacuum valve 79 is to be the destination for a fabric piece 15, the vacuum valve 79 takes an open position; otherwise, that vacuum valve 79 remains closed.

As is illustrated schematically in FIG. 2, the vacuum line 82 is fluidly interconnected with each of the downstream conduits 78 of each of the branch lines 70 that lead from the main line 40a. The vacuum line 82 leads to a single vacuum source 80 (driven by a vacuum motor 84 shown schematically in FIG. 8), which provides suction to all the branch lines 70 interconnected with the main line 40a. Those skilled in this art will appreciate that the vacuum source 80 can be any known to those skilled in this art to be capable of providing a vacuum through the piping system 30 sufficient to lift a fabric piece 15 from the unloading table 16 and convey it through the piping system 30 to a receiving station 90. Exemplary vacuum sources include pumps, blowers, and the like. It is preferred that each vacuum source 80 operate continuously, although intermittent operation of a vacuum source that coincides with the passage of a fabric piece 15 through the main line 40a is also suitable. For either continuous or intermittent blower operation, it is preferred that the vacuum motor 84 be electrically connected to the controller 17 and its operation be coupled to the transport of a fabric piece 15 in the attached main line 40a. Typically, the vacuum source 80 should provide between about 300 and 400 cfm of airflow to enable the fabric pieces 15 to be lifted from the unloading table 16 into the piping system 30.

As seen in FIGS. 2 and 3, the receiving station 90 comprises a rotatable carousel 92 having four vertically-oriented, cylindrical receiving tubes 94. The carousel 92 is positioned beneath a stationary plate 95 that is mounted at the downstream end 75 of the deposit nozzle 74. Each receiving tube 94 is open at its upper end and closed via a hinged exit door 96 at its lower end. The exit door 96 may be manually operated or may be connected to a remote actuator, such as a foot pedal (not shown) that can be actuated by the operator. The carousel 92 rotates about a substantially vertical axis so that each receiving tube 94 can move to a position beneath the longitudinal axis the deposit nozzle 74. Preferably, the receiving station 90 includes a drive motor 97 (shown schematically in FIG. 8) or other drive means for driving the carousel 92 between receiving positions. The motor 97 is preferably electrically coupled with the controller 17 so that a desired receiving tube 94 is rotated beneath the longitudinal axis of the deposit nozzle 74 to receive a fabric piece. Also, the receiving station 90 can include a position sensor (not shown) within the receiving tubes or in another location which is connected to the controller 17 to signal the arrival of a fabric piece 15 therein; this signal can be operatively coupled with the vacuum valve 79 and the supplementary air valve 44 such that detection of a fabric piece 15 within a receiving tube 94 causes the vacuum valve 79 to close. Further, the receiving tube 94 may also include means for assisting the fabric pieces 15 to exit the receiving tube 94, such as an air jet or plunger, to prevent inadvertent sticking or clogging by fabric pieces.

Operation of the fabric transport system 10 begins with the cutting apparatus 14 cutting fabric pieces 15 from a fabric sheet supplied by the fabric roll 12. The fabric pieces 15 are then conveyed to the unloading table 16. The controller 17 then signals the gantry unit 18 to move the suction head 24 to a predetermined location generally above the first fabric piece 15 intended for transport. Preferably, the suction head 24 is moved to a location in which the pincher 25 can pickup a central portion of a fabric piece 15.

As the suction head 24 is moving into position, the controller 17 signals the routing valve 42a, 42b, 42c positioned on the main line 40a, 40b, 40c which is to receive the fabric piece 15 to open. For example, if the fabric piece 15 is to be conveyed into main line 40a, the route valve 42a opens while routing valves 42b and 42c remain closed. As a result, the fabric piece 15 is assured of being conveyed into the main line 40a rather than to either of main lines 40b or 40c. Also, the vacuum valve 79 on the branch line 70 that leads to the desired receiving station 90 is opened by the controller 17. All other vacuum valves 79 on the other branch lines 70 on main line 40a remain closed. Consequently, the vacuum source 80 draws air through the suction head 24, the intake line 31, the main line 40a, that branch line 70, and the vacuum line 82.

After the proper vacuum valve 79 and routing valve 42a have been opened and the suction head 24 has moved into position, the fabric piece 15 is picked up by the pincher 25, moved thereby to the inlet nozzle 32, and released. Suction through the intake line 31 draws the fabric piece 15 into the intake nozzle 32. Because the suction head 24 can move directly between fabric pieces 15 rather than having to move completely away from the unloading table 16, pick-up of subsequent fabric pieces 15 is quite efficient and involves no wasted motion.

After the fabric piece 15 has entered the intake nozzle 32, it passes through the flexible tubing 34 and into the manifold 35. In so travelling, the fabric piece 15 passes by the photoelectric sensor 37, which detects the fabric piece 15 and signals the controller 17 of its presence. If the fabric piece is destined for a receiving station 90 connected to the main line 40a, the counterflow valve 36 remains closed; if instead the fabric piece 15 is destined for a receiving station 90 connected with either of the main line 40b, 40c, the counterflow valve 36 opens to enable a secondary air flow to urge the fabric piece 15 into the proper main line without overshooting it. The ensuing discussion will assume that an exemplary fabric piece 15 is destined for a receiving station 90 connected with a branch line 70 that is connected with T-fitting 48 on main line 40a; thus, the fabric piece 15 is to travel through the main line 40a, and the counterflow valve 36 remains closed.

After traveling through the manifold 35, the fabric piece 15 enters and begins to travel downstream within the main line 40a. Once the fabric piece 15 (or a sequential stream of fabric pieces 15 destined for a common receiving tube 94) has passed the photoelectric sensor 43, the controller 17 signals the routing valve 42a to close to prepare for the unloading and transport of another fabric piece 15. Closing this valve 42a ensures that the main line 40a will convey only one fabric piece 15 (or a sequential stream of fabric pieces 15 destined for a common receiving tube 94) at a time to ensure that the piece 15 is transported to the proper destination. Also, closing of the routing valve 42a frees the fabric system 10 to convey another fabric piece 15 to a receiving station 90 positioned on a different main line 40b, 40c and thereby increase the throughput of fabric pieces 15.

In addition, detection of the fabric piece 15 by the photoelectric sensor 43 induces the controller 17 to open the supplementary air valve 44 prior to the closing of the routing valve 42a. The opening of this valve 44 provides an air supply to convey the fabric piece 15 further through the main line 40a; otherwise, the closing of the routing valve 42a would leave the main line 40a with no air supply with which to convey the fabric piece 15.

The operation of the system 10 from this point depends on the predetermined destination of the fabric piece 15. If, for example, the fabric piece 15 were to be conveyed to the receiving station 90 that is connected with the branch line 70 attached to the T-fitting 46, detection of the fabric piece 15 by the photoelectric sensor 43 also causes the controller 17 to actuate the counterflow air valve 56. If instead, and as assumed for exemplary purposes, the fabric piece 15 is to be conveyed to the receiving station 90 that is connected with the branch line 70 attached to T-fitting 48, detection of the fabric piece 15 by the photoelectric sensor 54 causes the controller 17 to actuate the counterflow valve 56. Finally, if the fabric piece 15 were to be conveyed to a branch line 70 and receiving station 90 positioned farther downstream, the counterflow air valve 56 remains closed, and the controller 17 opens the counterflow valve 60.

Continuing with an exemplary fabric piece 15 that is to be conveyed into the branch line 70 connected with the T-fitting 48, as the fabric piece 15 approaches the T-fitting 48, it has a certain amount of downstream momentum directed parallel to the main line 40a. Clearly, the fabric piece 15 must overcome this momentum in order to be diverted into the proper branch line 70. To augment the suction provided by the vacuum source 80 to the branch line 70, the opening of the counterflow valve 56 provides a secondary air flow within the section of the main line 40a between the counterflow valve 56 and the T-fitting 48 which flows in the direction opposite that of the primary air flow (i.e., the airflow moving downstream from the intake line 31 within the main line 40a). As the secondary air flow reaches the T-fitting 48, it is also diverted into the branch line 70. As a result, as a fabric piece 15 nears and reaches the T-fitting 48, it is urged by the primary air flow and the secondary airflow to pass into the branch line 70. Therefore, even if the fabric piece 15 has sufficient momentum from its travel through the upstream portion of the main line 40a that it "overshoots" the branch line 70 rather than being diverted, the fabric piece 15 is urged by the secondary airstream to travel back to the branch line 70 and be conveyed therethrough. This safeguard prevents fabric pieces 15 from simply lingering within the main line 40a in a position beyond the branch line 70 and, in severe instances, from being misdirected to the incorrect destination.

Further travel of the fabric piece 15 is best understood by reference to FIGS. 2 through 4. After the fabric piece 15 enters the desired branch line 70, it passes through the upstream conduit 72 and into the deposit nozzle 74. As can be seen in FIG. 3, the airstream is drawn downwardly through the deposit nozzle 74, then upwardly within the lumen of the bifurcating section 76 and out the stem of the bifurcating section 76 into the downstream conduit 78. From there the airstream is then drawn through the open vacuum valve 79, into the common vacuum lines 82, and to the vacuum source 80. In contrast, the fabric piece 15 has sufficient momentum exiting the outlet end 75 of the deposit nozzle 74 that it is unable to reverse its direction (as the air flow does) and thus travels directly into a predetermined receiving tube 94 of the receiving station 90. As noted above, the deposit nozzle 74 is narrowed at its outlet end 75 relative to its upstream end in order to accelerate the fabric piece 15 exiting the outlet end 75 and thus provide additional momentum to prevent the fabric piece 15 from following the airstream.

Figure 5:
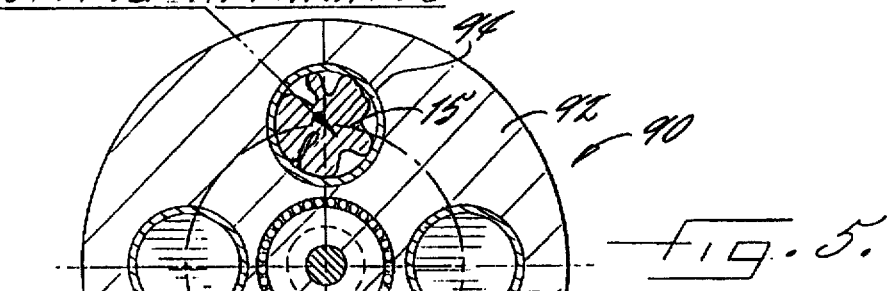
FIG. 5 is a top section view of a receiving station taken along lines 7—7 of FIG. 3 showing a fabric piece received in a receiving tube.
Figure 6:
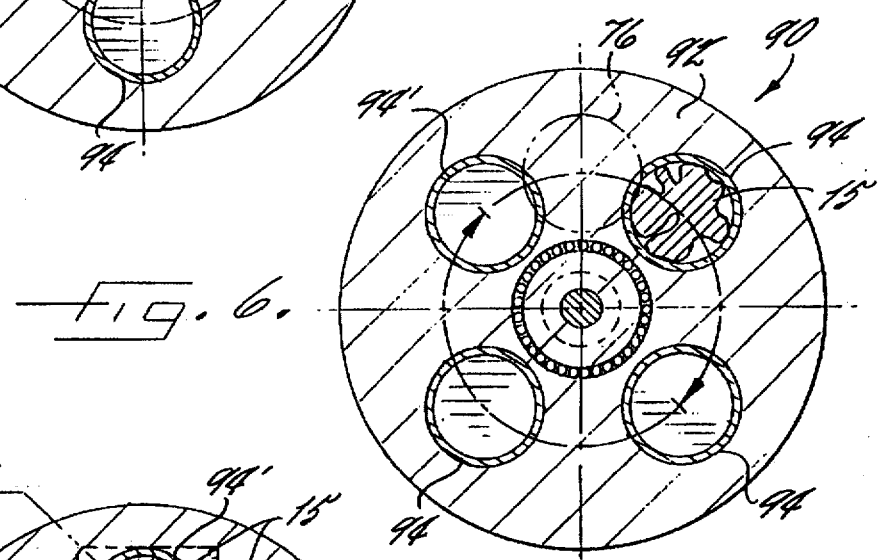
FIG. 6 is a top section view of the receiving station of FIG. 5 taken along lines 7—7 of FIG. 3 rotated slightly clockwise with the position of the bifurcating section represented in phantom line.
Figure 7:
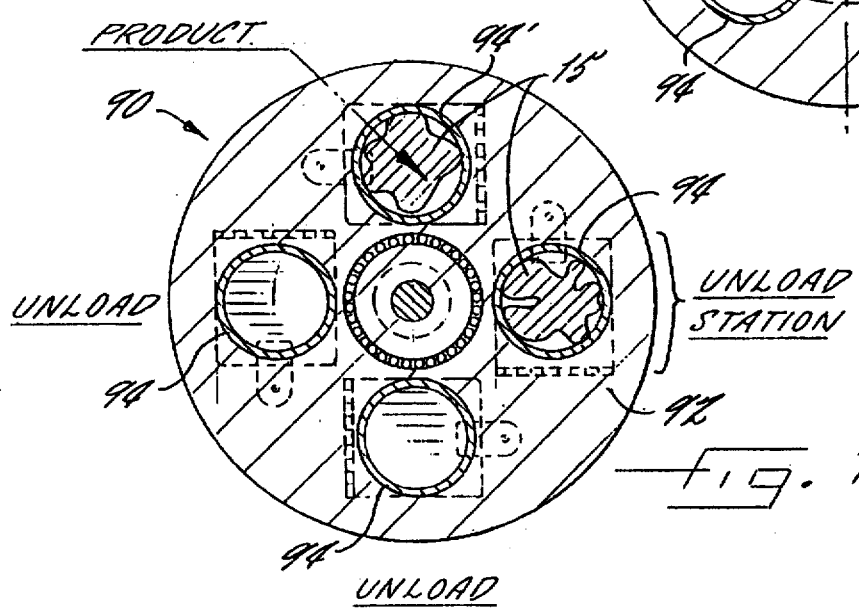
FIG. 7 is a top section view taken along lines 7—7 of FIG. 3 showing the receiving station rotated 90° from its position in FIG. 5 such that a second receiving tube receives a fabric piece and the first receiving tube is in position to be unloaded of its fabric piece.

Turning now to FIGS. 5 through 7, once the fabric piece 15 has been deposited in a receiving tube 94 of the receiving station 90, the controller 17 may cause the carousel 92 to rotate about its axis (FIG. 6) to a position in which another receiving tube 94' is positioned beneath the outlet end 75 of the deposit nozzle 74. As such, it is positioned to receive the next fabric piece conveyed through that particular branch line 70. Of course, rotation of the carousel 92 depends on whether it is desired that the next fabric piece 15 be deposited in the receiving tube 94 or the receiving tube 94'. In certain operations, it may be preferred that all pieces that are to be used in the same garment be deposited in the same receiving tube; in other operations, it may be preferred that similar fabric pieces for different garments be deposited in the same receiving tube.

It is noteworthy that the controller 17 monitors the location and ultimate delivery of each fabric piece 15. As such, the operator need not keep track of which fabric piece 15 is received in which receiving tube 94. As a result, parts for a single garment can be conveyed to multiple receiving stations 90 without losing garment associativity as the unassembled pieces 15 progress from one sewing operation to the next.

Once the fabric piece 15 (or the final fabric piece 15 of a sequential stream of fabric pieces destined for a common receiving tube 94) has reached the receiving tube 94, the vacuum valve 79 and the supplementary air valve 44 are directed by the controller 17 to close. This action discontinues the suction within the main line 40a and the branch line 70. As such, the main line 40a is then ready to receive another fabric piece 15 to be conveyed to the same or to another destination.

As can be discerned from the foregoing discussion and the accompanying drawings, the fabric transport system 10 can quickly and easily convey fabric pieces to diverse destinations. Back-up mechanisms, such as the routing valves 42a, 42b, 42c, the counterflow valves 56 and 60, and the narrowed end 75 of the deposit nozzle 74 vastly reduce or eliminate incomplete or incorrect delivery of fabric pieces. The fabric transport system 10 can operate with virtually no labor. As such, it can comfortably be integrated into the aforementioned APPAREL ON DEMAND clothing production concept.

Those skilled in this art will recognize that the present invention may include alternative configurations for unloading and initial transport. For example, if only two main lines are to be employed, each can be connected to the suction head 24 through its own intake line. The pincher 25 can be designed to alternatively place fabric pieces in one intake line, then the other, for transport to their respective main lines. Such a configuration would not need to include a common manifold from which the main lines extend.

The foregoing embodiments is illustrative of the present invention, and are not to be construed as limiting thereof. The invention is defined by the following claims, with equivalents of the claims to be included therein.

That which is claimed is:

1. A system for transporting a fabric piece from a predetermined departure location to a first predetermined destination, said system comprising a series of fluidly communicating tubes and including:
    an intake line configured to receive a fabric piece from the predetermined departure location;
    a main line having first and second ends and being fluidly connected at said first end with said intake line;
    a first branch line having upstream and downstream ends fluidly connected at said upstream end to an intermediate portion of said main line at a first junction, said first branch line including a deposit nozzle leading to the first predetermined destination;
    a vacuum source connected with said downstream end of said first branch line for drawing air of sufficient quantity and velocity through said intake line, said main line, and said first branch line to draw a fabric piece into said intake line and said main line;
    a counterflow valve positioned on an intermediate portion of said main line between said first junction and said main line second end, said counterflow valve being configured to take open and closed positions; and
    means for actuating said counterflow valve to take its open position prior to a fabric piece passing said first junction such that air is drawn into said main line and subsequently into said first branch line by said vacuum source so as to assist a fabric piece traveling in said main line from said intake line to be shunted into said first branch line from said main line.

2. The fabric transport system defined in claim 1, further comprising a valve positioned on said first branch line downstream of said deposit nozzle, said valve being moveable between an open position in which air is free to be drawn through said first branch line to said vacuum source, and a closed position in which air is prevented from being drawn through said first branch line to said vacuum source.

3. The fabric transport system defined in claim 1, further comprising a second branch line interconnected at one end with said main line and at an opposite end to said vacuum source, said second branch line further including a second deposit nozzle leading to a second predetermined destination.

4. The fabric transport system defined in claim 3, further comprising a second valve positioned on said second branch line downstream of said second deposit nozzle, said second valve being moveable between an open position, in which air is free to be drawn through said second branch line to said vacuum source, and a closed position, in which air is prevented from being drawn through said second branch line to said vacuum source.

5. The fabric transport system defined in claim 1, further comprising a receiving station positioned downstream of said first branch line deposit nozzle at the first predetermined destination.

6. The fabric transport system defined in claim 5, wherein said receiving station comprises:
    a plurality of receptacles; and
    means for moving at least one of said plurality of receptacles into a position adjacent an outlet end of said deposit nozzle to receive the fabric piece.

7. The fabric transport system defined in claim 6, wherein said receiving station further comprises fabric piece exit means for withdrawing the fabric piece from said receiving station.

8. The fabric transport system defined in claim 7, wherein said fabric piece exit means comprises a door moveable between an open position, in which the fabric piece is accessible for removal, and a closed position, in which the fabric piece is inaccessible for removal.

9. The fabric transport system defined in claim 1, further comprising a fabric cutting table having an unloading surface, and wherein the predetermined departure location is located upon said unloading surface.

10. The fabric transport system defined in claim 9, wherein said intake line is operably coupled with means for moving said intake line to the predetermined departure location.

11. The fabric transport system defined in claim 1, wherein said deposit nozzle includes a narrowed downstream end.

12. A system for providing a cut fabric piece to a first predetermined destination, said system comprising:
    a fabric cutting table for supporting a fabric piece;
    means for cutting a fabric piece into one or more fabric pieces;
    means for supporting said fabric pieces in respective departure positions;
    a series of fluidly communicating tubes and including:
        an intake line configured to receive a fabric piece from the predetermined departure location;
        a main line having first and second ends and being fluidly connected at said first end with said intake line;
        a first branch line having upstream and downstream ends fluidly connected at said first end to an intermediate portion of said main line at a first junction, said first branch line having a deposit nozzle leading to the first predetermined destination;
        a vacuum source connected with said downstream end of said first branch line for drawing air of sufficient quantity and velocity through said intake line, said main line, and said first branch line to draw a fabric piece into said intake line and said main line;
        a counterflow valve positioned on an intermediate portion of said main line between said first junction and said main line second end, said counterflow valve being configured to take open and closed positions; and
        means for actuating said counterflow valve to take its open position prior to a fabric piece passing said first junction such that air is drawn into said main line and subsequently into said first branch line by said vacuum source so as to assist a fabric piece traveling in said main line from said intake line to be shunted into said first branch line from said main line; and a receiving station at the first predetermined destination.

13. The fabric transport system defined in claim 12, further comprising a valve positioned on said first branch line downstream of said deposit nozzle, said valve being moveable between an open position in which air is free to be drawn through said first branch line to said vacuum source, and a closed position in which air is prevented from being drawn through said first branch line to said vacuum source.

14. The fabric transport system defined in claim 13, further comprising a second branch line interconnected at one end with said main line and at an opposite end to said vacuum source, said second branch line further including a second deposit nozzle leading to a second predetermined destination.

15. The fabric transport system defined in claim 14, further comprising a second valve positioned on said second branch line downstream of said second deposit nozzle, said second valve being moveable between an open position, in which air is free to be drawn through said second branch line to said vacuum source, and a closed position, in which air is prevented from being drawn through said second branch line to said vacuum source.

16. The fabric transport system defined in claim 12, further comprising a receiving station positioned downstream of said first branch line deposit nozzle at the first predetermined destination.

17. The fabric transport system defined in claim 16, wherein said receiving station comprises:

a plurality of receptacles; and means for moving at least one of said plurality of receptacles into a position downstream of said deposit nozzle to receive the fabric piece.

18. The fabric transport system defined in claim 17, wherein said receiving station further comprises fabric piece exit means for withdrawing the fabric piece from said receiving station.

19. The fabric transport system defined in claim 18, wherein said fabric piece exit means comprises a door moveable between an open position, in which the fabric piece is accessible for removal, and a closed position, in which the fabric piece is inaccessible for removal.

20. The fabric transport system defined in claim 12, further comprising a fabric cutting table having an unloading surface, and wherein the predetermined departure location is located upon said unloading surface.

21. The fabric transport system defined in claim 20, wherein said intake line is operably coupled with means for moving said intake line to the predetermined departure location.

22. The fabric transport system defined in claim 12, wherein said deposit nozzle includes a narrowed downstream end portion.

23. A method of transporting a fabric piece from a departure station to a first predetermined destination, said method comprising the steps of:

passing a first airstream through an inlet and into a main tube, said airstream having sufficient velocity and volumetric flow to lift the fabric piece from the departure station and convey it into the main tube;

passing the first airstream from the main tube through a first branch tube to convey the fabric piece from the main tube into the first branch tube;

opening a valve positioned on the main tube downstream of the first branch tube so that a second airstream passes through the valve, into the main tube, and into the first branch tube, said opening step being performed prior to the fabric piece entering the first branch tube, said second airstream being of sufficient velocity and volumetric flow to urge the fabric piece to enter the first branch tube;

passing the first and second airstream toward the first predetermined destination so that the fabric piece is conveyed thereto.

* * * * *